UNITED STATES PATENT OFFICE.

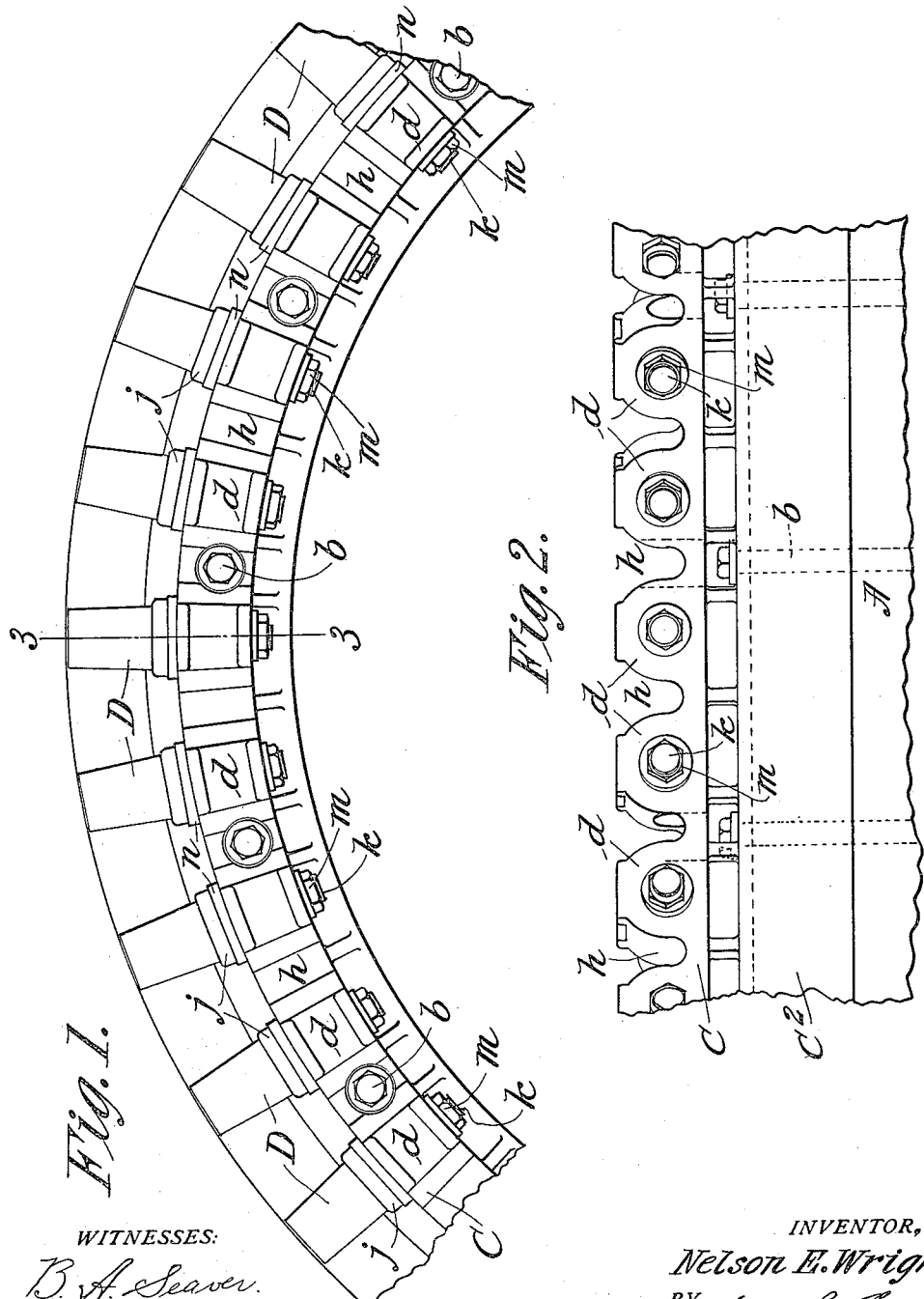

NELSON E. WRIGHT, OF SPRINGFIELD, MASSACHUSETTS.

ANTISKIDDING DEVICE FOR WHEELS.

1,232,468.  Specification of Letters Patent.  Patented July 3, 1917.

Application filed March 29, 1915. Serial No. 17,731.

*To all whom it may concern:*

Be it known that I, NELSON E. WRIGHT, a citizen of the United States of America, and resident of Springfield, in the county of Hampden and State of Massachusetts, have invented certain new and useful Improvements in Antiskidding Devices for Wheels, of which the following is a full, clear, and exact description.

This invention relates to improvements in anti-skidding devices, more particularly such as are applicable in connection with heavy solid tired wheels for motor trucks, although the same has availability in an advantageous manner on, or as an appliance for, lighter, pneumatic tired wheels.

The improved appliance is one designed to operate with as great an efficiency as, or an efficiency greater than, a tire chain, and with an avoidance of certain objectionable characteristics and results attendant on the use of a chain.

The invention is characterized by the provision on a tire provided wheel of a plurality of spaced anti-skid members supported by and aside from the wheel rim and having outward projections to an extent approximately corresponding to that of the tread of the tire.

In the drawings:—

Figure 1 represents an elevation at the outer side of a tired wheel on which the anti-skidding device of this invention is applied.

Fig. 2 is an inverted plan view of Fig. 1.

Similar characters of reference indicate corresponding parts in all of the views.

Figure 3:
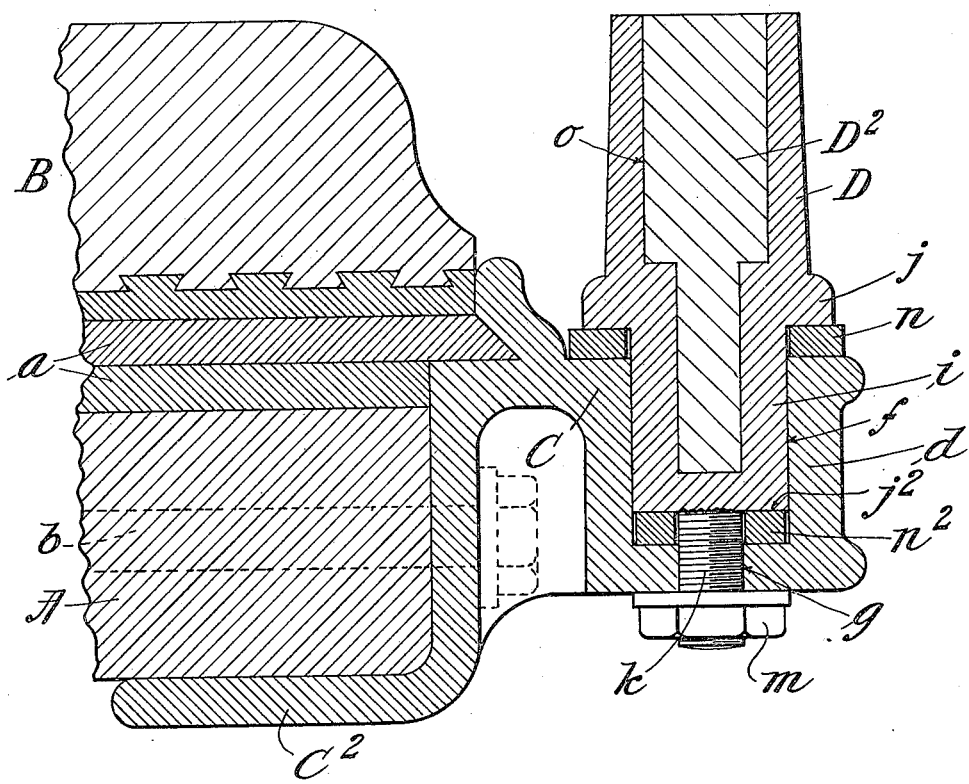
Fig. 3 is a cross sectional view, on a larger scale, as taken on the line 3—3, Fig. 1.

In the drawings, A represents the rim or felly of a wheel for a heavy automobile truck, which felly is shown as circumferentially provided with a metallic band or bands $a$ $a$ on which the base of the solid tire B is supported.

The rim or felly has a sidewise extending annular shelf-like flange C which is detachably secured thereto as by nut-provided bolts $b$. This flange is preferably provided with a supplemental angular flange $C^2$ which extends downwardly on the outer face of the felly and also under its inner circular face.

The shelf-like flange is provided with a series of anti-skid members D which project outwardly and radially of the wheel axis in an extent approximately corresponding to that of the tire tread.

The shelf-like flange extension C is made with a series of bosses $d$ $d$ having upwardly opening sockets $f$ therein provided with threaded holes $g$ of reduced diameter through the bottoms of the socketed bosses.

The said socketed bosses forming radially elongated portions of the shelf-like flange C, are formed as integral parts of the latter and are separated one from the other by the spaced sidewise and outwardly opening recesses $h$ $h$ for the avoidance of excessive weight.

The anti-skid members D are of a generally cylindrical form having shanks $i$ to fit in said sockets and having shoulders $j$ at intermediate portions thereof for a seating of the latter.

The said shanks $i$ have continuations in the form of reduced threaded extensions $k$ which are preferably screw engaged through the holes $g$ in the bases of the socketed bosses and receive on their protruding lower or inner ends the confining nuts $m$.

The anti-skidding members D are susceptible of radial adjustment, that is they may be radially distended to terminate circumferentially corresponding to the tire tread and to be inwardly withdrawn from time to time as the tire becomes worn so as to maintain the most effective relations, for anti-skidding purposes, to the tread.

$n$ represents a washer appurtenant to each of the intermediately shouldered anti-skidding devices, each being of comparatively large diameter, through the central opening of which the shank $i$ of the anti-skidding member is passed and having its place of occupancy on the top of the socketed portion $d$ of the flange extension and under the shoulder $j$.

A washer $n^2$ of smaller diameter is seated in the socket $f$ and forms a bottom support for the shank $i$,—these two washers being of corresponding thickness so as to conjointly support the anti-skid member D in its initial equipment on the truck wheel.

After usage, followed by a wearing down and diametrical reduction of the tire, the anti-skidding devices may be adjusted radially whereby their extremities will be coincident with an imaginary cylindrical surface as exactly or as near corresponding to the perimeter of the tire as may be desired or predetermined.

After a time when the tire shall have been considerably worn down, the anti-skid members D may be individually temporarily removed to permit of the substitution of somewhat thinner washers $n$, $n^2$, or, upon the removal of the washers, to permit the shouldered portion $j$ of each member D to bottom in the upper portion of the socketed member $d$, and to permit the shoulder $j^2$,—at the junction of the threaded extension $k$ with the shank $i$,—to bottom in the base of the socket.

The anti-skidding members D are represented as hollow, as by being made with outwardly opening bores $o$ in which cores $D^2$ are inserted, preferably with a hard driving fit.

These cores are preferably constituted by non-metallic material, such as wood, hard fiber or the like, or any other suitable material or composition for increasing the anti-skidding or slip-preventing character of the radially projecting members having their supports primarily from the wheel felly and having their locations outwardly offset therefrom.

The anti-skidding device in accordance with the foregoing specification and constructed as to its specific details as shown in the various drawings, may be a permanent provision of a wheel or an attachable and detachable appliance thereof, to be made use of under conditions requiring such, and to be removed and placed aside when the use thereof is not demanded.

The anti-skidding members being adapted for detachable connections in their situations shown, may all, or some thereof, be replaced as occasion may require as well as adjusted for their most effective tractional effect as heretofore made clear.

I claim:—

1. A wheel, the rim of which has a tire thereon, and also has a sidewise shelf-like extension provided with a series of sockets having bottoms which have threaded holes therethrough, a series of anti-skid members having shanks to fit in said sockets, shoulders at intermediate portions of the members for the seating of the latter, on the extension of the mouths of the sockets, and said shanks having reduced threaded extensions screw engaged through said holes, and nuts screw engaged on the lower ends of said threaded extensions.

2. A tire provided wheel having a sidewise shelf-like extension provided with a series of sockets having threaded holes through their bottoms, a series of anti-skid members having shanks to fit in said sockets, shoulders at intermediate portions of the members for the seating of the latter, and reduced threaded extensions of the shanks screw engaged through said holes, nuts screw engaged on the lower ends of said threaded extensions, positioning washers between the seating shoulders of the anti-skid members and the portions of the shelf extension marginally of the sockets therein, and diametrically smaller washers seated in the base of the sockets and surrounding the said reduced threaded extensions.

Signed by me at Springfield, Mass., in presence of two subscribing witnesses.

NELSON E. WRIGHT.

Witnesses:
WM. S. BELLOWS,
G. R. DRISCOLL.